United States Patent [19]

Scheibli

[11] Patent Number: 4,885,360
[45] Date of Patent: Dec. 5, 1989

[54] REACTIVE DYES CONTAINING A SULFONYL AND AN ALIPHATIC ACYL REACTIVE RADICAL

[75] Inventor: Peter Scheibli, Bottmingen, Switzerland

[73] Assignee: Ciba-Geigy Corporation, Ardsley, N.Y.

[21] Appl. No.: 275,651

[22] Filed: Nov. 21, 1988

Related U.S. Application Data

[63] Continuation of Ser. No. 14,086, Feb. 3, 1987, abandoned, which is a continuation of Ser. No. 748,716, Jun. 26, 1985, abandoned, which is a continuation of Ser. No. 561,484, Dec. 14, 1983, abandoned.

[30] Foreign Application Priority Data

Dec. 20, 1982 [CH] Switzerland ............................ 7431/82

[51] Int. Cl.$^4$ ..................... C09B 62/83; C09B 62/84; C09B 62/835; C09B 62/825
[52] U.S. Cl. ..................................... 534/642; 534/641; 534/603; 534/615; 534/614; 534/618; 534/612; 534/629; 544/77; 540/130; 8/549; 552/232
[58] Field of Search ................................ 534/641, 642

[56] References Cited

U.S. PATENT DOCUMENTS

| | | | |
|---|---|---|---|
| 2,657,205 | 10/1953 | Heyna et al. | 260/185 |
| 3,129,052 | 4/1964 | Dawson et al. | 534/642 X |
| 3,450,689 | 6/1969 | Langbein | 534/642 X |
| 3,517,013 | 6/1970 | Skamatsu et al. | 260/278 |
| 3,558,592 | 1/1971 | de Montmollin et al. | 260/199 |
| 3,957,751 | 5/1976 | Bauer et al. | 260/153 X |
| 4,257,770 | 3/1981 | Nishimura et al. | 534/642 X |

FOREIGN PATENT DOCUMENTS

| | | | |
|---|---|---|---|
| 43560 | 1/1982 | European Pat. Off. | 534/642 |
| 48355 | 3/1982 | European Pat. Off. | 534/642 |
| 0071168 | 2/1983 | European Pat. Off. | 534/642 |
| 0073481 | 3/1983 | European Pat. Off. | 534/642 |
| 2040620 | 2/1972 | Fed. Rep. of Germany . | |
| 3011447 | 10/1981 | Fed. Rep. of Germany . | |
| 3327713 | 2/1985 | Fed. Rep. of Germany | 534/642 |
| 164645 | 9/1983 | Japan | 534/642 |
| 80046 | 4/1952 | Norway | 534/642 |
| 1103513 | 2/1968 | United Kingdom | 534/642 |
| 1195786 | 6/1970 | United Kingdom | 534/642 |
| 1471737 | 4/1977 | United Kingdom . | |

OTHER PUBLICATIONS

Venkataraman, The Chemistry of Synthetic Dyes, vol. VI, Reactive Dyes, Academic Press, N.Y., 1972, p. 19.

Primary Examiner—Charles F. Warren
Assistant Examiner—Carolyn S. Greason
Attorney, Agent, or Firm—Wenderoth, Lind & Ponack

[57] ABSTRACT

Reactive dyes of the formula

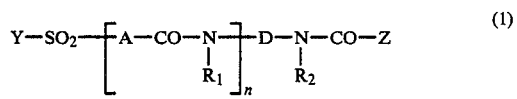

in which D is the radical of a dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $R_1$ and $R_2$, independently of each other, are each hydrogen or the radical of an unsubstituted or substituted hydrocarbon, A is an unsubstituted or substituted aliphatic or aromatic bridge member, n is 0 or 1, Y is a —CH=CH$_2$ or —CH$_2$CH$_2$—X radical, X is an inorganic or organic radical detachable under alkaline conditions, Z is a radical of the formula

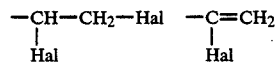

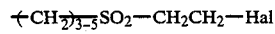

or

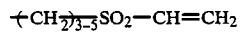

and Hal is chlorine or bromine, and if n is 1 Z must not be either of the two radicals mentioned at the end for Z, are suitable for dyeing or printing cellulose fibre materials and produce lightfast and wetfast dyeings or prints.

2 Claims, No Drawings

REACTIVE DYES CONTAINING A SULFONYL AND AN ALIPHATIC ACYL REACTIVE RADICAL

This application is a continuation of now abandoned application Ser. No. 014,086, filed Feb. 3, 1987, which application is a continuation of now abandoned application Ser. No. 748,716, filed June 26, 1985, which application is, in turn, a continuation of now abandoned application Ser. No. 561,484, filed Dec. 14, 1983.

The present invention relates to novel reactive dyes, to a process for their preparation, and to their use for dyeing or printing fibre materials.

The practice of dyeing with reactive dyes has recently led to increased demands on the quality of the dyeings and the economics of the dyeing process. The development in the reactives field is therefore not yet complete, and there continues to be a demand for novel reactive dyes with improved properties, in general and in particular in respect of the application.

It is the object of the present invention to provide novel, improved reactive dyes which are distinguished by good allround fastness properties, for example wet-fastness properties, and in particular by high degrees of fixation and high fibre-dye bond stabilities. The novel dyes should be especially suitable for dyeing by the exhaust method and the cold pad-batch method and also for printing, and, furthermore, the unfixed portions should be washed off easily.

The novel reactive dyes defined below meet the stated requirements.

The invention accordingly provides reactive dyes of the formula $$Y-SO_2-\left[A-CO-N\atop\phantom{A-CO-}R_1\right]_n D-N-CO-Z \quad (1)$$
$$\phantom{Y-SO_2-\left[A-CO-N\right]_n D-}R_2$$

in which D is the radical of a dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $R_1$ and $R_2$, independently of each other, are each hydrogen or the radical of an unsubstituted or substituted hydrocarbon, A is an unsubstituted or substituted aliphatic or aromatic bridge member, n is 0 or 1, Y is a $-CH=CH_2$ or $-CH_2CH_2-X$ radical, X is an inorganic or organic radical detachable under alkaline conditions, Z is a radical of the formula

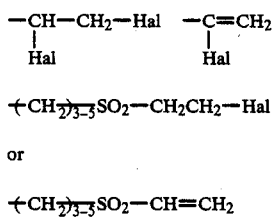

and Hal is chlorine or bromine, and if n is 1 Z must not be either of the two radicals mentioned at the end for Z.

Preferred groups of compounds are:

(a) reactive dyes of the formula (1) in which D is the radical of a monoazo or disazo dye or a metal complex azo dye;

(b) reactive dyes of the formula (1) in which D is the radical of an anthraquinone dye;

(c) reactive dyes of the formula (1) in which D is the radical of a formazan dye;

(d) reactive dyes of the formula (1) in which D is the radical of a dioxazine dye;

(e) reactive dyes as per (a) wherein D is the radical of a 1:1 copper complex azo dye of the benzene or naphthalene series, and each copper atom is bonded on either side to a metallisable group in ortho-position relative to the azo bridge;

(f) reactive dyes as per (a) wherein $R_1$ and $R_2$, independently of each other, are each hydrogen or methyl;

(g) reactive dyes as per (f) and of the formula

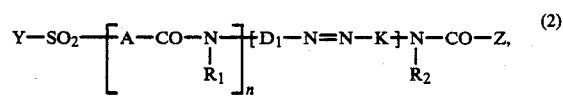

in which $D_1$ is the radical of a diazo component of the benzene or naphthalene series, K is the radical of a coupling component of the benzene or naphthalene series or of the heterocyclic series, $R_1$ and $R_2$, independently of each other, are each hydrogen or methyl, A is a bridge member of the formula $-(CH_2)_{3-5}-$, n is 0 or 1, Y and Z are as defined for the formula (1), and the radicals

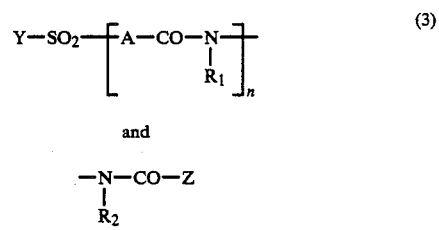

are bonded one to the diazo component one to the coupling component, or the two radicals of the formulae (3) and (4) are both bonded to the diazo or the coupling component;

(h) reactive dyes as per (g) wherein n is 1, A is propylene, Y is β-sulfatoethyl, vinyl, β-acetoxyethyl, β-phosphonooxyethyl, β-thiosulfatoethyl or β-chloroethyl, and Z is α,β-dibromoethyl or α-bromovinyl; and (i) reactive dyes as per (g) wherein n is 0, Y is β-sulfatoethyl, vinyl, β-acetoxyethyl, β-phosphonooxyethyl, β-thiosulfatoethyl or β-chloroethyl, and Z is α,β-dibromoethyl, α-bromovinyl, 3-(β-chloroethylsulfonyl)propyl or 3-vinylsulfonylpropyl.

The radical D in the formula (1) can be substituted in a conventional manner. Examples of further substituents on the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. The radical D preferably contains one or more sulfonic acid groups. Reactive dyes of the formula (1) in which D is the radical of an azo dye contain as substituents in particular methyl, ethyl, methoxy, and acetylamino, benzoylamino, amino, chlorine, bromine, ureido, hydroxyl, carboxyl, sulfomethyl or sulfo.

The radical of an unsubstituted or substituted hydrocarbon $R_1$ or $R_2$ is for example an alkyl radical which is straight-chain or branched, which preferably has 1 to 7 carbon atoms, and which can be further substituted, for example by halogen, hydroxyl, cyano, alkoxy, carboxyl or sulfo, or an unsubstituted alkyl radical having 7 to 20 carbon atoms, a cyclohexyl radical, or a phenyl radical which can be substituted, for example by methyl, ethyl, methoxy, ethoxy, chlorine, bromine, carboxyl, sulfo or sulfomethyl. Examples of $R_1$ and $R_2$ are the following substituents: methyl, ethyl, propyl, isopropyl, butyl, isobutyl, sec.-butyl, tert.-butyl, pentyl, hexyl, nonyl, dodecyl, hexadecyl, pentadecyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl, β-sulfatoethyl, cyclohexyl, phenyl, o-, m- or p-chlorophenyl, o-, m- or p-methylphenyl, p-ethylphenyl, p-methoxyphenyl, o-, m- or p-sulfophenyl, p-carboxyphenyl and p-sulfomethylphenyl. Unsubstituted or substituted alkyl radicals having 1 to 4 carbon atoms, in particular methyl, are preferred.

The aliphatic or aromatic bridge member A is preferably an alkylene or arylene radical. Thus, A can be a long alkylene radical (for example having 10 or more carbon atoms) or a shorter, straight-chain or branched alkylene radical; suitable in particular is an alkylene radical having 2 to 6 carbon atoms, for example ethylene, propylene, butylene, hexylene or cyclohexylene. An arylene radical A is for example a naphthylene radical, the radical of a diphenyl or stilbene or in particular a phenylene radical. The radical A can contain further substituents, for example halogen atoms, such as fluorine, chlorine or bromine, alkyl groups having 1 to 4 carbon atoms, such as methyl, ethyl or propyl, alkoxy groups having 1 to 4 carbon atoms, such as methoxy, ethoxy, propyloxy and isopropyloxy, carboxyl or sulfo. A is preferably $C_{3-5}$-alkylene. The propylene radical is preferred.

An inorganic or organic radical X detachable under alkaline conditions can be one of the following anionically detachable groups:

—OSO$_3$H, —SSO$_3$H, —OCOCH$_3$, —OPO$_3$H$_2$

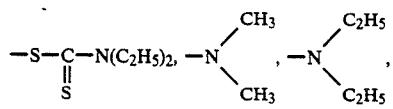

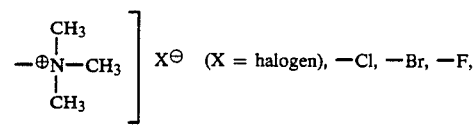

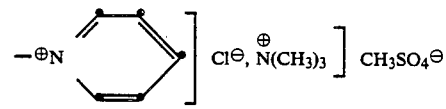

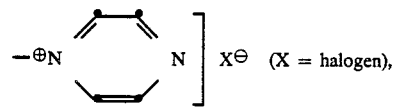

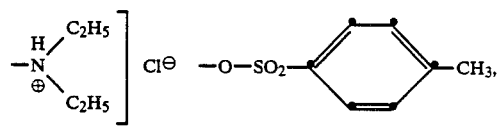

—O—SO$_2$—N(CH$_3$)$_2$, —N—SO$_2$—CH$_3$,
                        |
                        CH$_3$

—O—SO$_2$—CH$_3$, —S—C≡N,

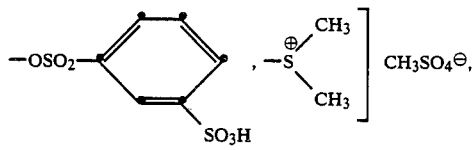

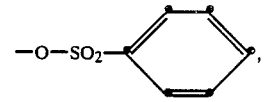

—OOCCCl$_3$, —OOCCHCl$_2$, —OOCCH$_2$Cl,

—O—O$_2$SR (R = alkyl or aryl), —O—SO$_2$—N(C$_2$H$_5$)$_2$,

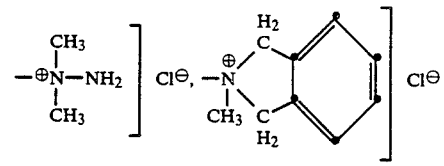

X is preferably a —OSO$_3$H, —SSO$_3$H, —OCOCH$_3$, —OPO$_3$H$_2$ or —CL radical.

If in the formula (1) n is 1, Z must not be a radical of the formula

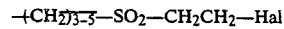

or

Reactive dyes of, for example, the formula

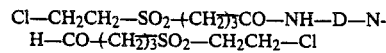

are thus excluded.

The Y and Z radicals in the formula (1) are fibre-reactive.

Fibre-reactive compounds are to be understood as meaning compounds which are capable of reacting with the hydroxyl groups of cellulose or with the amino groups of natural or synthetic polyamides to form covalent chemical bonds.

The process for preparing the reactive dyes of the formula (1) comprises introducing into dyes of the formula

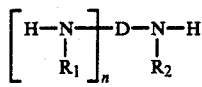    (5)

radicals of the formulae

Y—SO$_2$—[A—CO]$_n$    (6)

and

—CO—Z    (7)

in a manner known per se, or using precursors of dyes of the formula (5) which already contain radicals of the formulae (6) and (7), and converting these precursors into the desired end dyes of the formula (1), and if desired following up with a further conversion reaction.

The radicals of the formulae (6) and (7) are preferably introduced into the dye of the formula (5) by acylation with appropriate carboxylic acid halides or anhydrides; this holds for the radical of the formula (6) when n is 1. In this case the dye of the formula (5) has two acylatable amino groups, namely —N(R$_1$)H and —N(R$_2$)H. If n is 0, then introduction of the Y—SO$_2$— radical best proceeds from a precursor which already contains this radical, for example from 1-amino-4-β-sulfatoethylsulfonylbenzene used as diazo component; see below. The acylation of the dye of the formula (5) in which n is 1 with the two acylating agents, for example the acyl halides of the formulae Y—SO$_2$—A—CO—Hal    (8)

and

Z—CO—Hal    (9)

is preferably carried out in successive steps.

The process variant where the starting materials are dye precursors is suitable for preparing reactive dyes of the formula (1) in which D is the radical of a dye composed of two or more components. Examples of this type of dye composed of two or more components are monoazo, disazo, trisazo, tetraazo, metal complex azo, formazan and azomethine dyes.

In the case of, for example, a monoazo dye, a diazo component which, in addition to the amino group to be diazotised, contains a —N(R$_1$)H group, and a coupling component which contains a —N(R$_2$)H group are each reacted with an acyl halide of the formula (8) or (9), and the resulting products are coupled together to give the desired azo dye, and if desired this can be followed by a further conversion reaction.

Or a diazo component which contains an acylatable —N(R$_1$)H group is initially acylated with an acyl halide of the formula (8), is diazotised and is coupled onto a coupling component which contains a —N(R$_2$)H group, and after the coupling has been done the latter is acylated with an acyl halide of the formula (9).

In the embodiments described above, the acylatable —N(R$_1$)H group can also be present in the coupling component, and the —N(R$_2$)H group can correspondingly be present in the diazo component; i.e. the position of the radicals of the formulae (3) and (4) in the finished azo dye is not immutably tied to certain starting components - diazo component or coupling component. The radicals of the formulae (3) and (4) can each also be bonded to a diazo component, for example in the case of disazo dyes of the type

D$_1$→K←D$_2$

Reactive dyes of the formula (1) in which n is 0 can be prepared by starting from dyes which already contain a Y—SO$_2$— group and which are thus of the formula

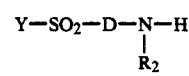    (10)

and acylating the —N(R$_2$)H group with an acyl halide of the formula (9); or by using the corresponding precursors, for example a diazo component of the formula

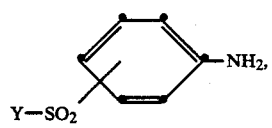    (11)

and coupling this onto a coupling component which contains a —N(R$_2$)H group, and, before or after the coupling, acylating the —N(R$_2$)H group with an acyl halide of the formula (9).

Furthermore, the two radicals of the formulae (3) and (4) can also be bonded to one and the same component, for example by using a non-fibre-reactive diazo component and a coupling component of the formula

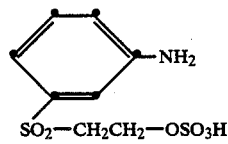    (12)

and, after the coupling, acylating the —NH$_2$ group with an acyl halide of the formula (9).

In principle, the reactive dyes of the formula (1) of all the dye classes can be prepared in a manner known per se or analogously to known procedures by starting from precursors or intermediates for dyes which contain fibre-reactive radicals of the formula (6) or (7), or introducing these fibre-reactive radicals into intermediates having dye characteristics and being suitable for this purpose.

The dyes of the formula (5) or the dye precursors are acylated with the acyl halides of the formulae (8) and (9) by methods known per se, preferably in an aqueous solution or suspension and in the presence of alkaline, acid-binding agents, for example aqueous alkali metal hydroxides, carbonates or bicarbonates.

Another advantageous method consists in first of all preparing a dye which contains a precursor of the reactive radical and subsequently converting this precursor into the end stage, for example by esterification or an addition reaction. For example, a dye of the formula (10) in which Y is a HO—CH$_2$CH$_2$— radical can be prepared, and the intermediate can be reacted, before or after the acylation, with sulfuric acid, so that the hydroxyl group is converted into the sulfato group; or use is made of an analogous dye wherein Y is the vinyl group H$_2$C=CH—, onto which intermediate is added thiosulfuric acid to form a HO$_3$SS—CH$_2$CH$_2$— radical.

The hydroxyl group in a dye of the formula (10) or in a suitable precursor is preferably sulfated by reaction with concentrated sulfuric acid at 0° C. to moderately elevated temperatures.

This sulfation can also be effected by reacting the hydroxyl compound with two equivalents of chlorosulfonic acid per hydroxyl group at 10° to 80° C. in a polar organic solvent, for example N-methylpyrrolidone. The sulfation is preferably effected by introducing the compound in question into sulfuric acid monohydrate at temperatures between 5° and 15° C.

The introduction of another inorganic or organic radical X detachable under alkaline conditions into a compound of the formula (1) or into an intermediate in place of a halogen atom or the sulfato group, for example in place of a thiosulfato of phosphato group, is effected in a manner known per se.

In addition, the synthesis can be followed upwith elimination reactions. For example, reactive dyes of the formula (1) which contain sulfatoethylsulfonyl radicals can be treated with agents, such as sodium hydroxide, which eliminate hydrogen halide, and the sulfatoethylsulfonyl radicals turn into vinyl sulfonyl radicals. Or, if in a reactive dye of the formula (1) the radical of the formula (4) is an α,β-dibromopropionylamino radical, the α,β-di-bromopropionyl group can be converted into the α-bromo-acryloyl group by treatment with agents which eliminate hydrogen halide, if desired this treatment can be carried out at the same time as the abovementioned elimination of sulfuric acid from a sulfatoethylsulfonyl radical.

The above-described route of preparation via an intermediate of the reactive radical proceeds in many cases uniformly and to completion.

If the reactive dyes prepared contain groups capable of metal complex formation, the reactive dyes can also be subsequently metallised.

There now follow specific examples of possible starting materials which can be used for preparing the reactive dyes of the formula (1).

The dyes of the formula (5) can be in particular dyes of the following structural types:

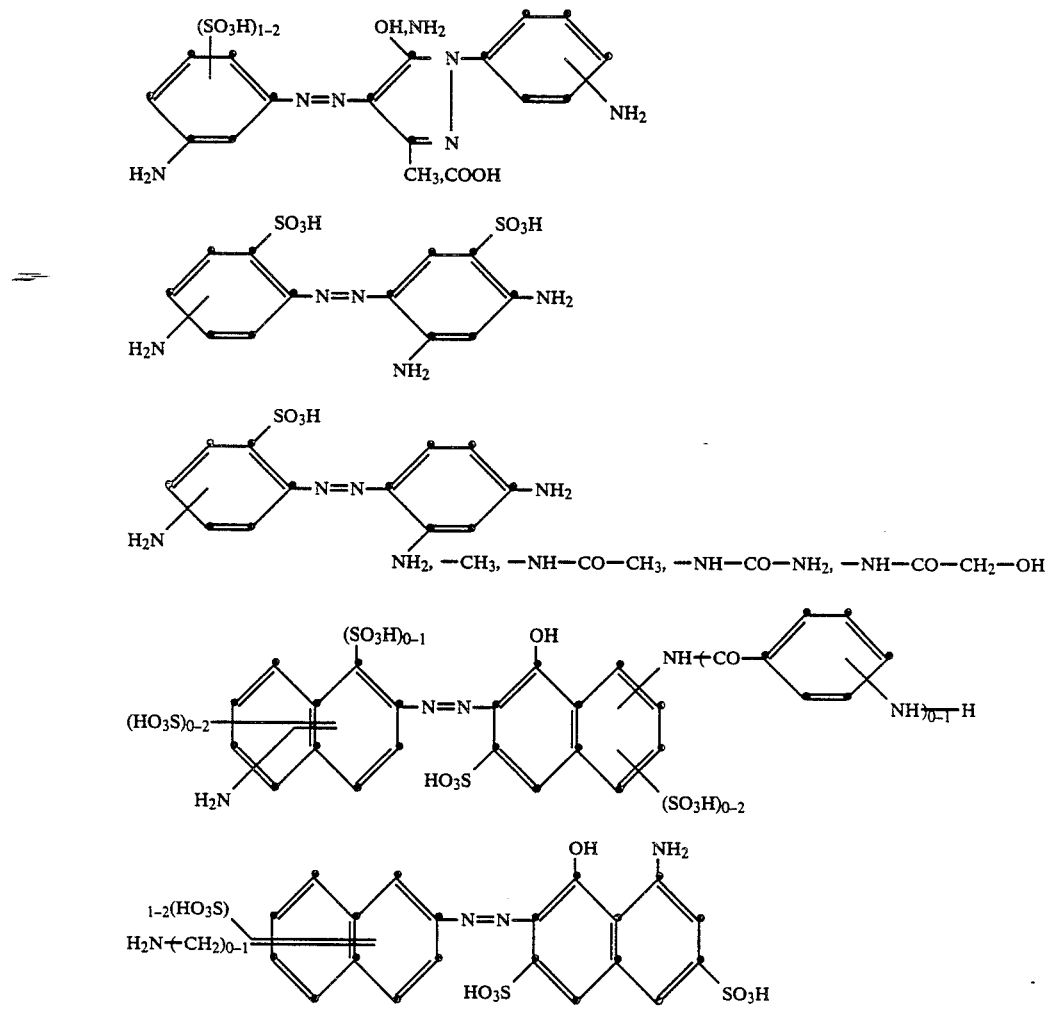

Metal complexes of dyes of the formulae:

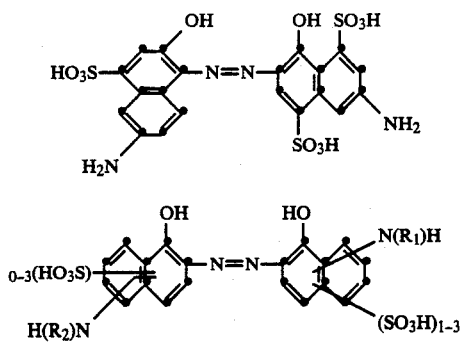

Preferred metal atoms are Cu (1:1 complex) and Cr and Co (1:2 complex). Cr and Co complexes can contain the azo compound of the formula shown above once or twice, i.e. they can be built up symmetrically or, using any other ligand groups, asymmetrically.

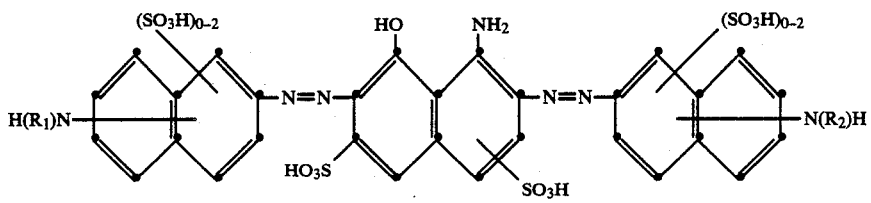

The fused rings indicated by broken lines are alternatively possible naphthalene systems.

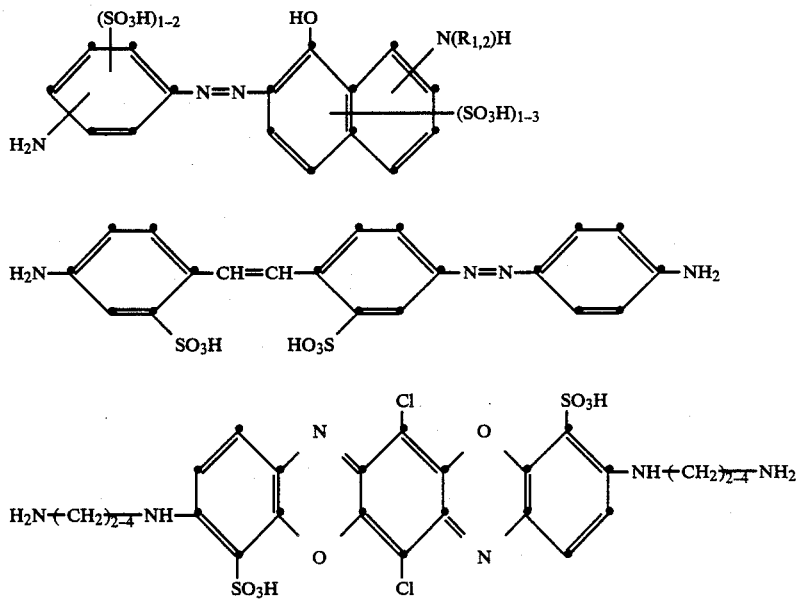

The dyes of the formulae shown above can be further substituted in the alkyl or aryl radicals, in particular by the substituents mentioned in the explanation of D in the formula (1).

as well as the metal complex azo dyes of the formulae

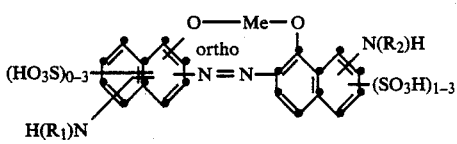

in which Me is Cu, Cr or Co, and

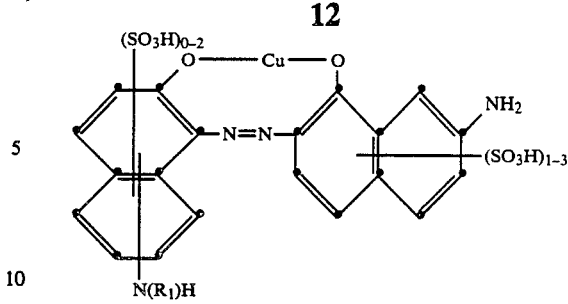
Examples of dyes of the formula (10) are:
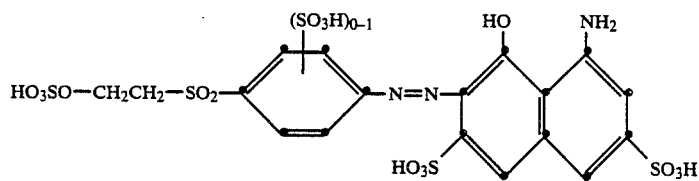
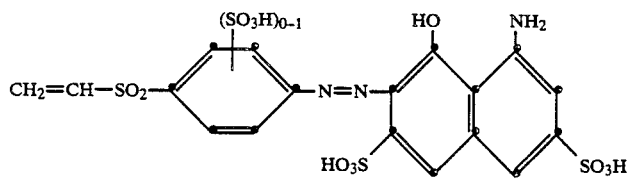
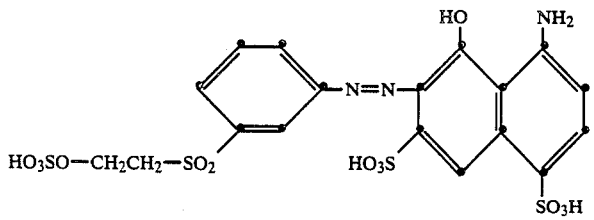
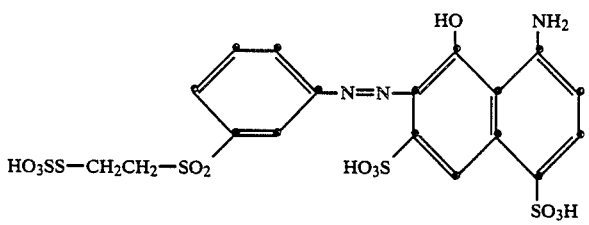
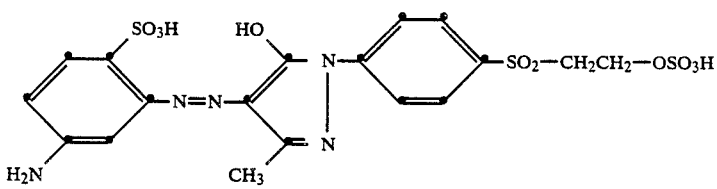
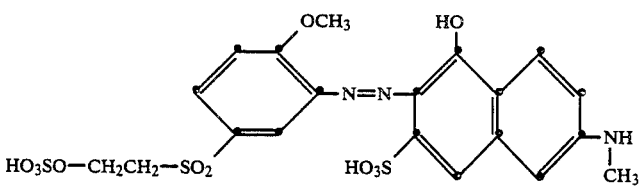

-continued
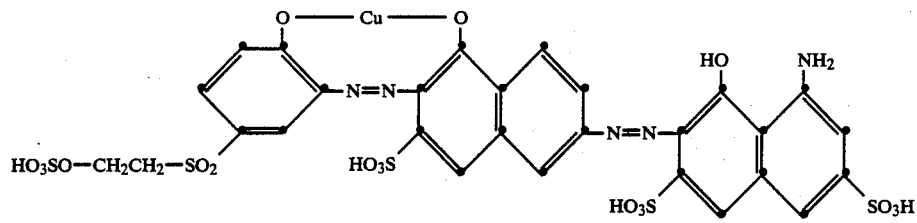
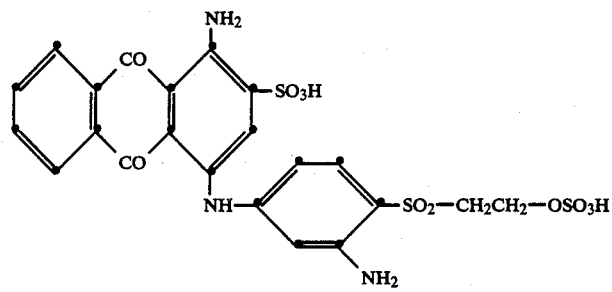
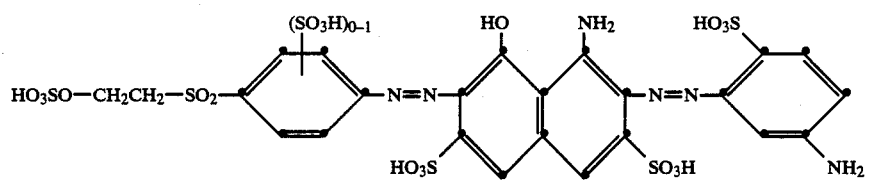
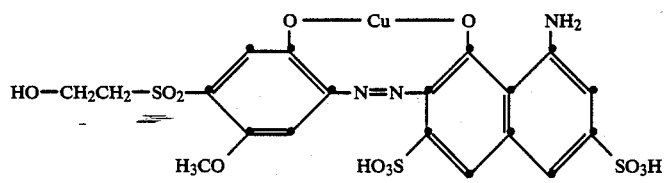
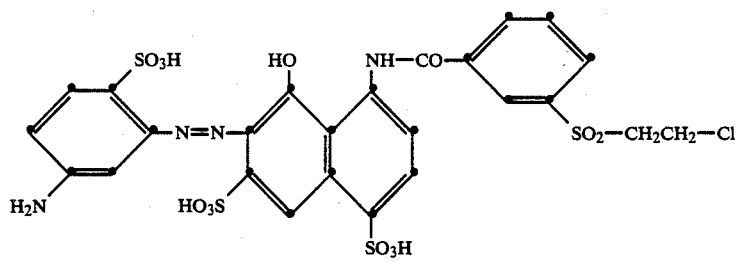
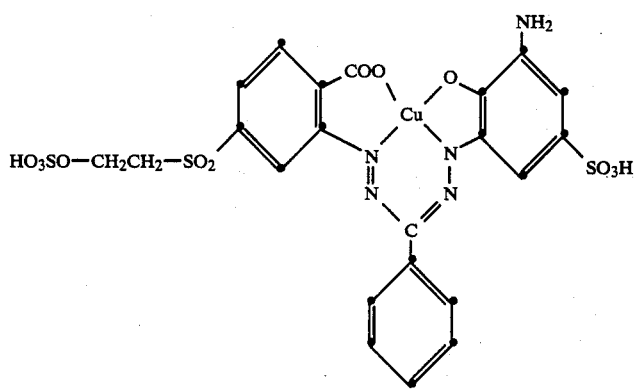

-continued
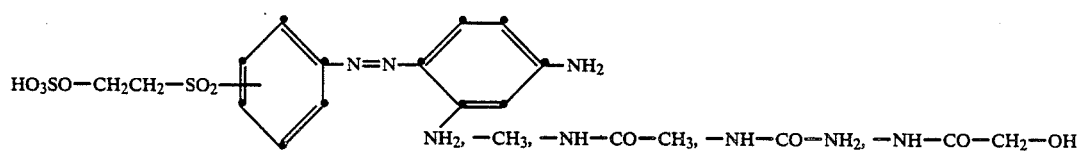
NH$_2$, —CH$_3$, —NH—CO—CH$_3$, —NH—CO—NH$_2$, —NH—CO—CH$_2$—OH
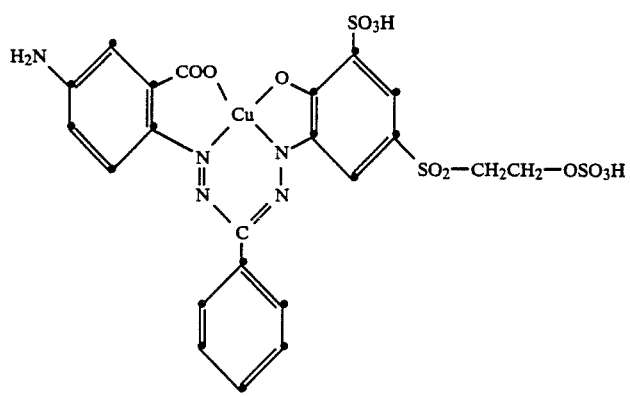
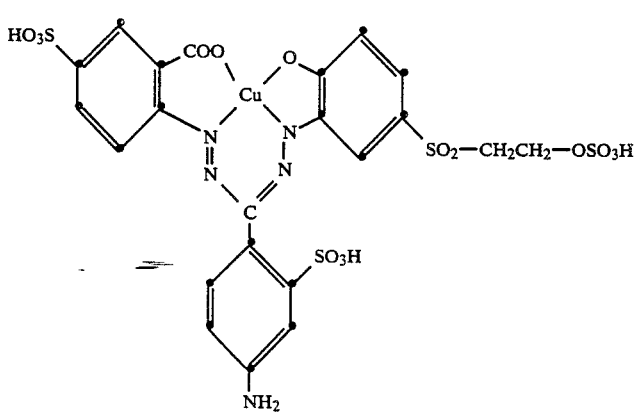
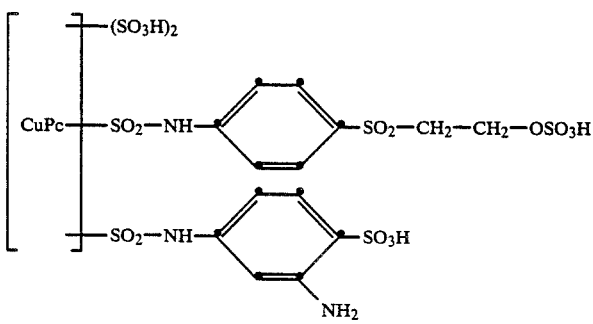
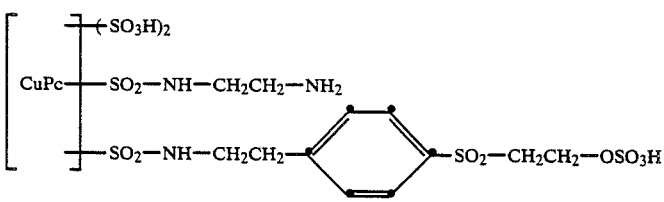

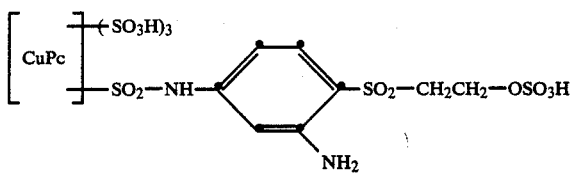
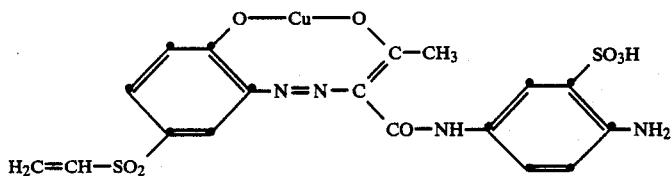
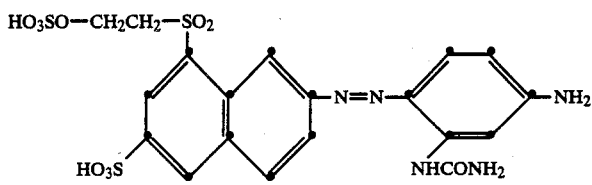
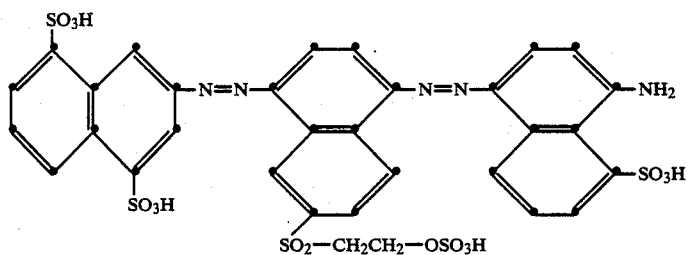
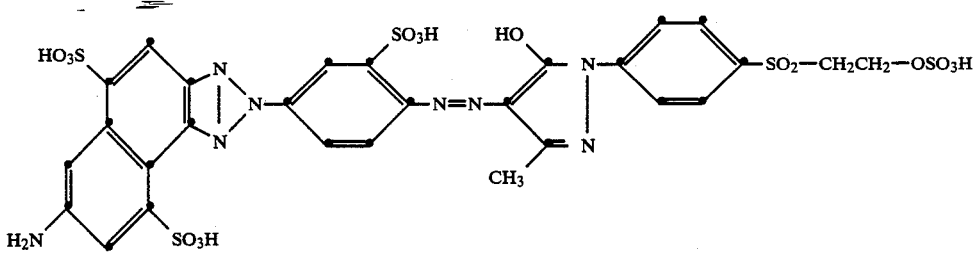
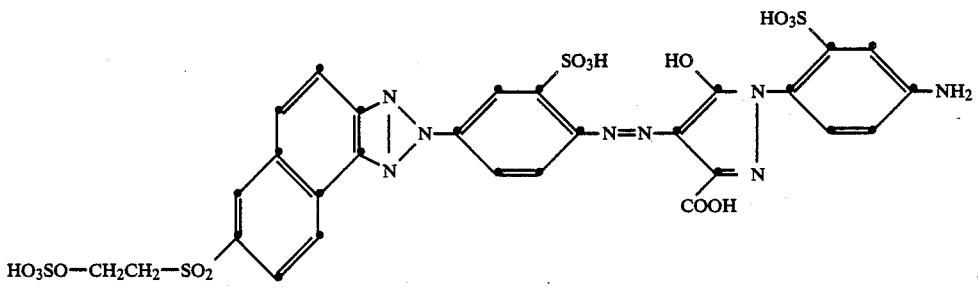
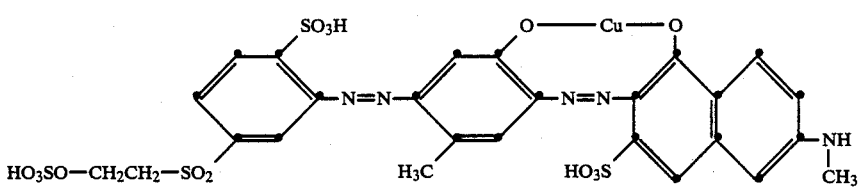

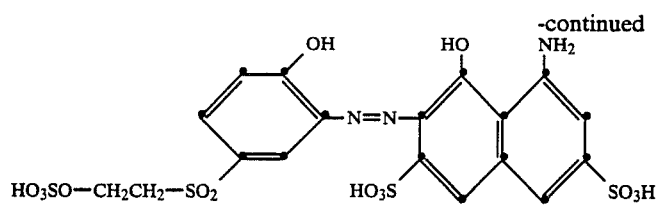

1:2-chromium complex

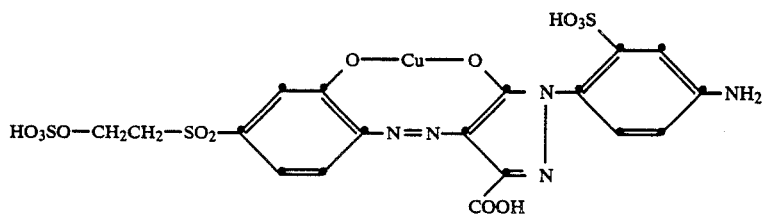

If in preparing the preferred reactive dyes of the formula (1) in which D is the radical of an azo dye the starting materials used are not the finished amino dyes, for example those described above, but dye precursors, i.e. the diazo and coupling components, the two components have to have an acylatable amino group, or one of the two components has to have an acylatable amino group and the other has to have a Y—SO$_2$— group. Possible diazo components are chiefly suitable compounds of the aminobenzene and aminonaphthalene series, for example those which are contained in the azo dyes of the formulae shown above, such as 1-amino-3-β-sulfatoethylsulfonylbenzene, 1-amino-4-β-sulfatoethylsulfonylbenzene, 1,3-di-aminobenzene-4-sulfonic acid, 1,3-diaminobenzene, 1,4-di-aminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4′-diaminostilbene, 4,4′-diaminodiphenylmethane, 4,4′-diaminobiphenyl(benzidine), 3,3′-dimethylbenzidine, 3,3′-dimethoxybenzidine, 3,3′-dichlorobenzidine, 3,3′-dicarboxybenzidine, 3,3′-dicarboxymethoxybenzidine, 2,2′-dimethyl-benzidine, 4,2′-diaminodiphenyl(diphenyline), 2,6-diaminonaphthalene-4,8-disulfonic acid, 1,4-diaminobenzene-2-sulfonic acid, 1,4-diamino-benzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3′- or 4′-aminobenzoylamino)-1-aminobenzene-6-sulfonic acid, 1-(4′-aminobenzoylamino)-4-aminobenzene-2,5-disulfonic acid, 1,4-diaminobenzene-2-carboxylic acid, 1,3-diamino-benzene-4-carboxylic acid, 1,2-diaminobenzene-4-carboxylic acid, 1,3-diaminobenzene-5-carboxylic acid, 1,4-diamino-2-methylbenzene, 4,4′-diaminodiphenyl oxide, 4,4′-diaminodiphenylurea-2,2′-disulfonic acid, 4,4′-diaminodiphenyloxyethane-2,2′-disulfonic acid, 4,4′-diaminostilbene-2,2′-disulfonic acid, 4,4′-diaminodiphenylethane-2,2′-disulfonic acid and 1,3,5-triaminobenzene. The coupling components are chiefly suitable compounds of the aminobenzene and naphthalene series, for example anilines, n-mono-substituted anilines, m-phenylenediamine derivatives, aminonaphthalenes, naphthols, aminonaphthalenesulfonic acid, naphtholsulfonic acids or aminonaphtholsulfonic acids, and also pyrazolones, aminopyrazoles, aminopyridines, hydroxypyridines, hydroxypyridones, aminopyrimidines, hydroxypyrimidines, indols, barbituric acid derivatives or acetoacetarylides. Examples are 3-aminophenylurea, 1,3-diaminobenzene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 2-amino-5-hydroxynaphthalene-7-sulfonic acid, 2-methylamino or 2-ethylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino or 2-ethylamino-8-hydroxynaphthalene-6-sulfonic acid, 2-amino-8-hydroxynaphthalene-3,6-disulfonic acid, 1-amino-5-hydroxynaphthalene-7-sulfonic acid, 1-amino-8-hydroxynaphthalene-3,6-or -4,6-disulfonic acid, 1-(4′-aminobenzoyl-amino)-8-hydroxynaphthalene-3,6-or -4,6-disulfonic acid, 1-(3′-aminobenzoylamino)-8-hydroxynaphthalene-3,6-or -4,6-disulfonic acid, 2-(4′-amino-3′-sulfophenylamino)-5-hydroxynaphthalene-7-sulfonic acid, 1-(2′-sulfo-4′-aminophenyl)-3-carboxypyrazolone-(5), 1-(3′-aminophenyl)-3-methyl-5-pyrazolone, 1-amino-3-(N,N-bis-β-hydroxyethylamino)benzene, 1-amino-3-(N,N-bis-β-sulfatoethylamino)benzene, 1-amino-3-(N,N-bis-β-hydroxyethylamino)-4-methoxybenzene, 1-amino-3-sulfobenzylamino-4-chlorobenzene and 1-amino-3-(N,N-bis-sulfobenzylamino)benzene. If one of the two components contains both reactive groups of the formulae (3) and (4) at the same time, or if these can be introduced into the component in question, as in the case of the coupling components of the formulae

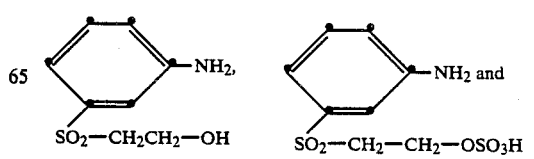

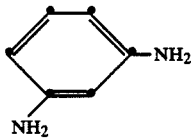

the other component, in this case the diazo component, can also be non-reactive, for example 1-aminobenzene-2-, -3- or -4-carboxylic acid, dehydrothio-p-toluidinesulfonic acid, 1-amino-3-trifluoromethylbenzene-6-sulfonic acid, 1-aminobenzene-2-, -3- or -4-sulfonic acid, 1-aminobenzene-2,4-and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3-or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3-or -4-sulfonic acid, 1-amino-2,4-dimethoxybenzene-6-sulfonic acid, 1-amino-2,5-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,3-diaminobenzene-4-sulfonic acid, 1,4-diaminobenzene-3-sulfonic acid, 1,4-diaminobenzene-2,5-disulfonic acid, 1-amino-3-or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-amino-naphthalene-3,6-or -5,7-disulfonic acid, 1-aminonaphthalene-3,6-or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4-disulfonic acid, 3-methoxy-4-amino-6-methylazobenzene-2',4'-disulfonic acid or 3-methoxy-4-amino-6-methylazobenzene-2',5'-disulfonic acid.

The intermediates containing one diazotisable amino group are generally diazotised at a low temperature in an aqueous mineral acid solution through the action of nitrous acid, and the coupling is carried out at a weakly acid, neutral, or weakly alkaline pH.

Acyl halides of the formulae (8) and (9): $\alpha,\beta$-dibromopropionyl chloride, $\alpha,\beta$-dichloropropionyl chloride, $\alpha$-bromoacryloyl chloride, $\alpha$-chloroacryloyl chloride, and, if desired, also halic anhydrides which react the same way, such as $\alpha,\beta$-dichloropropionic anhydride, 4-($\beta$-chloroethylsulfonyl)-butyryl chloride, and 4-vinylsulfonylbutyryl chloride.

The reactive dyes of the formula (1) are suitable for dyeing and printing a wide variety of materials, such as silk, leather, wool, polyamide fibres and polyurethanes, and in particular cellulose-containing fibre materials of any type. These fibre materials are for example the natural cellulose fibres, such as cotton, linen and hemp, as well as cellulose and regenerated cellulose. The reactive dyes of the formula (1) are also suitable for dyeing or printing hydroxyl-containing fibres which are present in blend fabrics, for example blends of cotton with polyester fibres or polyamide fibres.

The dyes according to the invention can be applied to the fibre material and fixed on the fibre in various ways, in particular in the form of aqueous dye solutions and print pastes. They are not only suitable for the exhaust method but also for dyeing by the pad-dyeing method, whereby the goods are impregnated with aqueous dye solutions which do or do not contain salt, and, after an alkali treatment or in the presence of alkali, the dyes are fixed, if desired under heat. They are particularly suitable for the cold pad-batch method, whereby the dye, together with the alkali, is applied on a pad-mangle and is subsequently fixed by storage at room temperature for several hours.

After fixing the dyeings or prints are thoroughly rinsed with cold and hot water, if desired in the presence of an agent which has a dispersing action and promotes the diffusion of the unfixed portions.

The reactive dyes of the formula (1) are distinguished by a high reactivity and a high degree of fixation. For this reason they can be exhaust-dyed at low dye temperatures, and require only short steaming times in the pad-steam method.

The degrees of fixation are high, and the unfixed portions are easily washed off.

The reactive dyes of the formula (1) are particularly suitable for dyeing cotton by the exhaust dyeing method, the difference between the degree of exhaustion and the degree of fixation being remarkably small, i.e. the hydrolysis loss is very low. The reactive dyes of the formula (1) are also particularly suitable for printing, especially on cotton, but likewise also for printing nitrogen-containing fibres, for example wool, silk or blend fabrics containing wool.

The dyeings and prints prepared with the dyes according to the invention are distinguished by clear shades. In particular, the dyeings and prints on cellulose fibre materials have a high tinctorial strength and a high fibre-dye bond stability, not only under acid but also under alkaline conditions, and also a good lightfastness and very good wetfastness properties, such as fastness to washing, water, seawater, cross-dyeing and perspiration, as well as a good pleating fastness, hot-pressing fastness and rubbing fastness.

The following examples serve to illustrate the invention. The temperatures are given in degrees centigrade. The parts and percentages are by weight, unless stated otherwise. Parts by weight relate to parts by volume as the kilogramme relates to the liter.

The preparation of the monoazo or disazo intermediates has not been described in all cases in the illustrative embodiments below, but it immediately follows from the general description.

EXAMPLE 1

A mixture of 28.1 parts of diazotised 1-amino-4-(β-sulfatoethylsulfonyl)-benzene with 300 parts of water is added at 0° to 5° C. to 73.2 parts of the coupling component of the formula (prepared by coupling diazotised 1-amino-5-(2,3-dibromopropionylamino)-benzene-2-sulfonic acid under acid conditions onto 1-amino-8-hydroxynaphthalene-3,6-disulfonic acid) dissolved in 600 parts of water. After the coupling reaction at pH 5.5 to 6.5 has ended, the resulting reactive dye of the formula

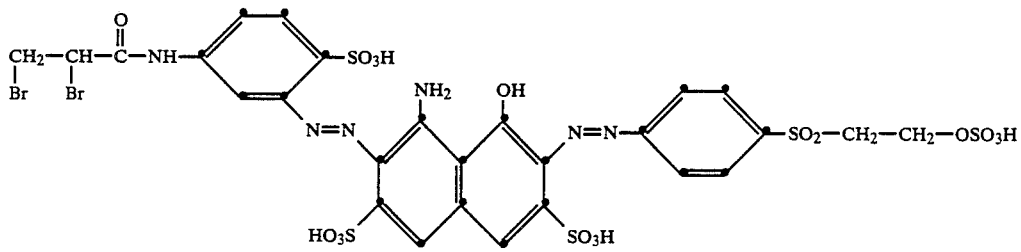

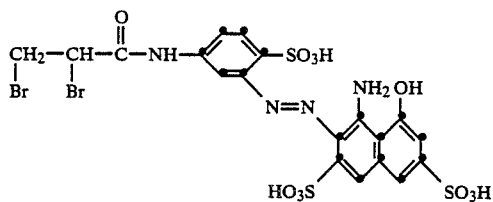

is isolated by evaporating or freeze-drying the reaction solution at pH 6. It dyes cotton in blue shades.

Further useful reactive dyes which dye cotton in the shades given in column 5 of Table 1 are obtained by coupling the diazotised diazo component given in column 2 under acid conditions in the manner of Example 1 onto the coupling component given in column 3, and coupling the diazotised diazo component given in column 4 onto the monoazo compound thus obtained.

TABLE 1

| No. | Diazo component | Coupling component | Diazo component | Shade on cotton |
|---|---|---|---|---|
| 1 | 1-Amino-5-(2,3-dibromo-propionylamino)-benzene-2-sulfonic acid | 1-Amino-8-hydroxynaphthalene-3,6-disulfonic acid | 1-Amino-4-(β-acetoxyethylsulfonyl)-benzene | blue |
| 2 | 1-Amino-5-(2,3-dibromo-propionylamino)-benzene-2-sulfonic acid | 1-Amino-8-hydroxynaphthalene-3,6-disulfonic acid | 1-Amino-4-(β-phosphonooxyethylsulfonyl)-benzene | blue |
| 3 | 1-Amino-5-(2,3-dibromo-propionylamino)-benzene-2-sulfonic acid | 1-Amino-8-hydroxynaphthalene-3,6-disulfonic acid | 1-Amino-4-(βthiosulfato-ethylsulfonyl)-benzene | blue |
| 4 | 1-Amino-4-(2,3-dibromo-propionylamino)-benzene-2-sulfonic acid | 1-Amino-8-hydroxynaphthalene-3,6-disulfonic acid | 1-Amino-4-(βsulfatoethylsulfonyl)-benzene | greenish blue |
| 5 | 1-Amino-5-(2,3-dibromo-propionylamino)-benzene-2-sulfonic acid | 1-Amino-8-hydroxynaphthalene-4,6-disulfonic acid | 1-Amino-4-(βsulfatoethylsulfonyl)-benzene | blue |
| 6 | 1-Amino-4-(β-sulfatoethylsulfonyl)-benzene | 1-Amino-8-hydroxynaphthalene-3,6-disulfonic acid | 1-Amino-5-(2,3-dibromo-propionylamino)-benzene-2-sulfonic acid | blue |
| 7 | 1-Amino-4-(β-acetoxyethylsulfonyl)-benzene | 1-Amino-8-hydroxynapthalene-3,6-disulfonic acid | 1-Amino-5-(2,3-dibromo-propionylamino)-benzene-2-sulfonic acid | blue |
| 8 | 1-Amino-5-(2,3-dibromo-propionylamio)-benzene-2-sulfonic acid | 1-Amino-8-hydroxynaphthalene-3,6-disulfonic acid | 1-Amino-5-(4-(β-chloro-ethylsulfonyl)-butyryl-amino)-benzene-2-sulfonic acid | blue |
| 9 | 1-Amino-4-(β-sulfatoethylsulfonyl)-benzene | 1-Amino-8-hydroxynaphthalene-3,6-disulfonic acid | 1-Amino-5-(4-(β-chloro-ethylsulfonyl)-butyryl-amino)-benzene-2-sulfonic acid | blue |
| 10 | 1-Amino-4-(β-acetoxyethylsulfonyl)-benzene | 1-Amino-8-hydroxynaphthalene-3,6-disulfonic acid | 1-Amino-5-(4-(βchloro-ethylsulfonyl)-butyryl-amino)-benzene-2-sulfonic acid | blue |
| 11 | 1-Amino-4-(β-sulfatoethylsulfonyl)-benzene | 1-Amino-8-hydroxynaphthalene-3,6-disulfonic acid | 1-Amino-5-(2,3-dichloro-propionylamino)-benzene-2-sulfonic acid | blue |
| 12 | 1-Amino-5-(2,3-dichloro-propionylamino)-benzene-2-sulfonic acid | 1-Amino-8-hydroxynaphthalene-3,6-disulfonic acid | 1-Amino-4-(β-sulfatoethylsulfonyl)-benzene | blue |
| 13 | 1-Amino-5-(2,3-dibromo-propionylamino)-benzene-2-sulfonic acid | 1-Amino-8-hydroxynaphthalene-3,6-disulfonic acid | 1-Amino-4-(β-sulfatoethylsulfonyl)-benzene-2-sulfonic acid | blue |
| 14 | 1-Amino-5-(4-(β-chloroethylsulfonyl)-butyrylamino)-benzene-2-sulfonic acid | 1-Amino-8-hydroxynaphthalene-3,6-disulfonic acid | 1-Amino-5-(2,3-dibromo-propionylamino)-benzene-2-sulfonic acid | blue |

TABLE 1-continued

| No. | Diazo component | Coupling component | Diazo component | Shade on cotton |
|---|---|---|---|---|
| 15 | 1-Amino-4-(β-sulfatoethyl-sulfonyl)-benzene-2-sulfonic acid | 1-Amino-8-hydroxynaphtha-lene-3,6-disulfonic acid | 1-Amino-5-(2,3-dibromo-propionylamino)-benzene-2-sulfonic acid | blue |
| 16 | 1-Amino-5-(4-(β-chloro-ethylsulfonyl)-butyryl-amino)-benzne-2-sulfonic acid | 1-Amino-8-hydroxynaphtha-lene-3,6-disulfonic acid | 1-Amino-4-(β-sulfato-ethylsulfonyl)-benzene | blue |
| 17 | 1-Amino-5-(4-(β-chloro-ethylsulfonyl)-butyryl-amino)-benzene-2-sulfonic acid | 1-Amino-8-hydroxynaphtha-lene-3,6-disulfonic acid | 1-Amino-4-(β-sulfato-ethylsulfonyl)-benzene-2-sulfonic acid | blue |
| 18 | 1-Amino-4-(β-sulfatoethyl-sulfonyl)-benzene-2-sulfonic acid | 1-Amino-8-hydroxynaphtha-lene-3,6-disulfonic acid | 1-Amino-5-(4-(β-chloro-ethylsulfonyl)-butyryl-amino)-benzene-2-sulfonic acid | blue |

Similarly good reactive dyes are obtained by using in the examples of Table 1 2-amino-5-hydroxynaphtha-lene-7-sulfonic acid or 1-amino-8-hydroxynaphthalene-4-sulfonic acid as coupling component in place of 1-amino-8-hydroxynaphthalene-3,6-or -4,6-disulfonic acid, and coupling the two diazo components onto these coupling components under acid and neutral conditions in the manner described in Example 1.

EXAMPLE 2

25.9 parts of the amino-containing coupling component of the formula

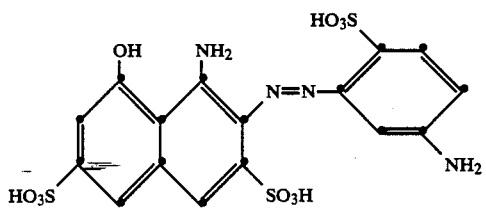

are dissolved in 500 parts of water under neutral conditions, and the solution is cooled to 10° C. At this temperature 13.8 parts of 2,3-dibromopropionyl chloride are added dropwise in the course of 20 minutes, during which the pH of the reaction solution is held at 6.5 to 7.0 by adding 2N sodium hydroxide solution at the same time. When the reaction has ended, a mixture of 14.1 parts of diazotised 1-amino-4-(β-sulfatoethylsulfonyl)-benzene with 150 parts of water is added at 0° to 5° C. When the coupling reaction at pH 5.5–6.5 has ended, the same reactive dye as in Example 1 has formed.

Further useful reactive dyes which dye cotton in the shades given in column 5 of Table 2 are obtained by reacting the amino-containing coupling component given in column 2 with the acylating agent given in column 3 in the manner described in Example 2, and coupling the diazotised diazo component given in column 4 onto the intermediate thus obtained.

TABLE 2

| No. | Coupling component | Acylating agent | Diazo component | Shade on cotton |
|---|---|---|---|---|
| 1 | 1-Amino-8-hydroxy-2-(5'-amino-2'-sulfophenylazo)-naphthalene-3,6-disulfonic acid | 2,3-Dibromopropionyl chloride | 1-Amino-4-(βacetoxy-ethylsulfonyl)-benzene | blue |
| 2 | 1-Amino-8-hydroxy-2-(5'-amino-2'-sulfophenylazo)-naphthalene-3,6-disulfonic acid | 2,3-Dibromopropionyl chloride | 1-Amino-4-(β-phosphonooxy-ethylsulfonyl)-benzene | blue |
| 3 | 1-Amino-8-hydroxy-2-(5'-amino-2'-sulfophenylazo)-naphthalene-3,6-disulfonic acid | 4-(β-Chloroethylsulfonyl)-butyryl chloride | 1-Amimo-4-(β-sulfatoethyl-sulfonyl)-benzene | blue |
| 4 | 2-Amino-5-hydroxynaphtha-lene-7-sulfonic acid | 2,3-Dibromopropionyl chloride | 1-Amino-4-(β-sulfatoethyl-sulfonyl)-benzene | orange |
| 5 | 2-Amino-5-hydroxynaphtha-lene-7-sulfonic acid | 4-(β-Chloroethylsulfonyl)-butyryl chloride | 1-Amino-4-(β-sulfatoethyl-sulfonyl)-benzene | orange |
| 6 | 2-Amino-5-hydroxynaphtha-lene-7-sulfonic acid | 2,3-Dibromopropionyl chloride | 1-Amino-5-(4-(βchloro-ethylsulfonyl)-butyryl-amino)-benzene-2-sulfonic acid | orange |
| 7 | 3-Amino-5-hydroxynaphtha-lene-7-sulfonic acid | 2,3-Dibromopropionyl chloride | 1-Amino-4-(β-sulfatoethyl-sulfonyl)-benzene | reddish orange |
| 8 | 3-Amino-5-hydroxynaphtha-lene-7-sulfonic acid | 4-(β-Chloroethylsulfonyl)-butyryl chloride | 1-Amino-4-(β-sulfatoethyl-sulfonyl)-benzene | reddish orange |
| 9 | 3-Amino-5-hydroxynaphtha-lene-7-sulfonic acid | 2,3-Dibromopropionyl chloride | 1-Amino-5-(4-(β-chloro-ethylsulfonyl)-butyryl-amino)-benzene-2-sulfonic acid | reddish orange |
| 10 | 1-(4'-Aminobenzoylamino)-8-hydroxynaphthalene-3,6- | 2,3-Dibromopropionyl chloride | 1-Amino-4-(β-sulfatoethyl-sulfonyl)-benzene | bluish red |

TABLE 2-continued

| No. | Coupling component | Acylating agent | Diazo component | Shade on cotton |
|---|---|---|---|---|
| | disulfonic acid | | | |
| 11 | 1-(4'-Aminobenzoylamino)-8-hydroxynaphthalene-3,6-disulfonic acid | 4-(β-Chloroethylsulfonyl)-butyryl chloride | 1-Amino-4-(β-sulfatoethyl-sulfonyl)-benzene | bluish red |
| 12 | 1-(4'-Aminobenzoylamino)-8-hydroxynaphthalene-3,6-disulfonic acid | 2,3-Dibromopropionyl chloride | 1-Amino-5-(4-(β-chloro-ethylsulfonyl)-butyryl-amino)-benzene-2-sulfonic acid | bluish red |
| 13 | 1-(3'-Aminobenzoylamino)-8-hydroxynaphthalene-3,6-disulfonic acid | 2,3-Dibromopropionyl chloride | 1-Amino-4-(β-sulfatoethyl-sulfonyl)-benzene | bluish red |
| 14 | 1-(3'-Aminobenzoylamino)-8-hydroxynaphthalene-3,6-disulfonic acid | 4-(β-Chloroethylsulfonyl)-butyryl chloride | 1-Amino-4-(β-sulfatoethyl-sulfonyl)-benzene | bluish red |
| 15 | 1-(3'-Aminobenzoylamino)-8-hydroxynaphthalene-3,6-disulfonic acid | 2,3-Dibromopropionyl chloride | 1-Amino-5-(4-(β-chloro-ethylsulfonyl)-butyryl-amino)-benzene-2-sulfonic acid | bluish red |
| 16 | 1-Amino-3-(N,N—di-(β-hydroxyethyl)-amino)-benzene | 2,3-Dibromopropionyl chloride | 1-Amino-4-(β-sulfatoethyl-sulfonyl)-benzene | reddish orange |
| 17 | 1-Amino-3-(N,N—di-(β-sulfatoethyl)-amino)-benzene | 2,3-Dibromopropionyl chloride | 1-Amino-4-(β-sulfatoethyl-sulfonyl)-benzene | orange |
| 18 | 1-Amino-3-(N,N—di-(β-sulfatoethyl)-amino)-benzene | 4-(β-Chloroethylsulfonyl)-butyryl chloride | 1-Amino-4-(β-sulfatoethyl-sulfonyl)-benzene | orange |
| 19 | 1-Amino-3-(N,N—di-(β-sulfatoethyl)-amino)-benzene | 2,3-Dibromopropionyl chloride | 1-Amino-5-(4-(β-chloro-ethylsulfonyl)-butyryl-amino)-benzene-2-sulfonic acid | orange |
| 20 | 1-Amino-8-hydroxynaphtha-lene-3,6-disulfonic acid | 2,3-Dibromopropionyl chloride | 1-Amino-4-(β-sulfatoethyl-sulfonyl)-benzene | red |
| 21 | 1-Amino-8-hydroxynaphtha-lene-3,6-disulfonic acid | 2,3-Dibromopropionyl chloride | 1-Amino-4-(β-sulfatoethyl-sulfonyl)-benzene-2-sulfonic acid | red |
| 22 | 1-Amino-8-hydroxynaphtha-lene-3,6-disulfonic acid | 2,3-Dibromopropionyl chloride | 1-Amino-5-(4-(β-chloro-ethylsulfonyl)-butyryl-amino)-benzene-2-sulfonic acid | red |
| 23 | 1-Amino-8-hydroxynaphtha-lene-3,6-disulfonic acid | 2,3-Dibromopropionyl chloride | 1-Amino-3-(β-sulfatoethyl-sulfonyl)-benzene | red |
| 24 | 1-Amino-8-hydroxynaphtha-lene-3,6-disulfonic acid | 4-(βChloroehtylsulfonyl)-butyryl chloride | 1-Amino-5-(2,3-dibromo-propionylamino)-benzene-2-sulfonic acid | red |
| 25 | 1-Amino-8-hydroxynaphtha-lene-3,6-disulfonic acid | 4-(βChloroethylsulfonyl)-butyryl chloride | 1-Amino-4-(β-sulfatoethyl-sulfonyl)-benzene | red |
| 26 | 1-Amino-8-hydroxynaphtha-lene-3,6-disulfonic acid | 4-(βChloroethylsulfonyl)-butyryl chloride | 1-Amino-4-(β-sulfatoethyl-sulfonyl)-benzene-2-sulfonic acid | red |
| 27 | 1-Amino-8-hydroxynaphtha-lene-3,6-disulfonic acid | 4-(βChloroethylsulfonyl)-butyryl chloride | 1-Amino-3-(β-sulfatoethyl-sulfonyl)-benzene | red |
| 28 | 1-Amino-8-hydroxynaphtha-lene-3,6-disulfonic acid | 2,3-Dichloropropionyl chloride | 1-Amino-4-(β-sulfatoethyl-sulfonyl)-benzene | red |
| 29 | 1-Amino-8-hydroxynaphta-lene-3,6-disulfonic acid | 2,3-Dichloropropionyl chloride | 1-Amino-5-(4-(β-chloro-ethylsulfonyl)-butyryl-amino)-benzene-2-sulfonic acid | red |
| 30 | 1-Amino-8-hydroxynaphtha-lene-3,6-disulfonic acid | 2,3-Dichloropropionyl chloride | 1-Amino-4-(β-sulfatoethyl-sulfonyl)-benzene-2-sulfonic acid | red |
| 31 | 1-Amino-8-hydroxynaphtha-lene-3,6-disulfonic acid | 2,3-Dichloropropionyl chloride | 1-Amino-3-(β-sulfatoethyl-sulfonyl)-benzene | red |
| 32 | 2-Amino-5-hydroxynaphtha-lene-7-sulfonic acid | 2,3-Dibromopropionyl chloride | 1-Amino-4-(β-sulfatoethyl-sulfonyl)-benzene-2-sulfonic acid | orange |
| 33 | 2-Amino-5-hydroxynaphtha-lene-7-sulfonic acid | 2,3-Dibromopropionyl chloride | 1-Amino-3-(β-sulfatoethyl-sulfonyl)-benzene | orange |
| 34 | 2-Amino-5-hydroxynaphtha-lene-7-sulfonic acid | 4-(β-Chloroethylsulfonyl)-butyryl chloride | 1-Amino-5-(2,3-dibromo-propionylamino)-benzene-2-sulfonic acid | orange |
| 35 | 2-Amino-5-hydroxynaphtha-lene-7-sulfonic acid | 4-(β-Chloroethylsulfonyl)-butyryl chloride | 1-Amino-4-(β-sulfatoethyl-sulfonyl)-benzene-2-sulfonic acid | orange |
| 36 | 2-Amino-5-hydroxynaphtha-lene-7-sulfonic acid | 4-(β-Chloroethylsulfonyl)-butyryl chloride | 1-Amino-3-(β-sulfatoethyl-sulfonyl)-benzene | orange |
| 37 | 2-Amino-5-hydroxynaphtha-lene-7-sulfonic acid | 2,3-Dichloropropionyl chloride | 1-Amino-4-(β-sulfatoethyl-sulfonyl)-benzene | orange |
| 38 | 2-Amino-5-hydroxynaphtha-lene-7-sulfonic acid | 2,3-Dichloropropionyl chloride | 1-Amino-5-(4-(β-chloroethyl-sulfonyl)-butyrylamino)- | orange |

TABLE 2-continued

| No. | Coupling component | Acylating agent | Diazo component | Shade on cotton |
|---|---|---|---|---|
| 39 | 2-Amino-5-hydroxynaphthalene-7-sulfonic acid | 2,3-Dichloropropionyl chloride | 1-Amino-4-($\beta$-sulfatoethylsulfonyl)-benzene-2-sulfonic acid | orange |
| 40 | 2-Amino-5-hydroxynaphthalene-7-sulfonic acid | 2,3-Dichloropropionyl chloride | 1-Amino-3-($\beta$-sulfatoethylsulfonyl)-benzene | orange |
| 41 | 3-Amino-5-hydroxynaphthalene-7-sulfonic acid | 2,3-Dibromopropionyl chloride | 1-Amino-4-($\beta$-sulfatoethylsulfonyl)-benzene-2-sulfonic acid | orange |
| 42 | 3-Amino-5-hydroxynaphthalene-7-sulfonic acid | 2,3-Dibromopropionyl chloride | 1-Amino-3-($\beta$-sulfatoethylsulfonyl)-benzene | orange |
| 43 | 3-Amino-5-hydroxynaphthalene-7-sulfonic acid | 4-($\beta$-Chloroethylsulfonyl)-butyryl chloride | 1-Amino-5-(2,3-dibromopropionylamino)-benzene-2-sulfonic acid | orange |
| 44 | 3-Amino-5-hydroxynaphthalene-7-sulfonic acid | 4-($\beta$-Chloroethylsulfonyl)-butyryl chloride | 1-Amino-4-($\beta$-sulfatoethylsulfonyl)-benzene-2-sulfonic acid | orange |
| 45 | 3-Amino-5-hydroxynaphthalene-7-sulfonic acid | 4-($\beta$-Chloroethylsulfonyl)-butyryl chloride | 1-Amino-3-($\beta$sulfatoethylsulfonyl)-benzene | orange |
| 46 | 3-Amino-5-hydroxynaphthalene-7-sulfonic acid | 2,3-Dichloropropionyl chloride | 1-Amino-4-($\beta$-sulfatoethylsulfonyl)-benzene | orange |
| 47 | 3-Amino-5-hydroxynaphthalene-7-sulfonic acid | 2,3-Dichloropropionyl chloride | 1-Amino-5-(4-($\beta$-chloroethylsulfonyl)-butyrylamino)-benzene-2-sulfonic acid | orange |
| 48 | 3-Amino-5-hydroxynaphthalene-7-sulfonic acid | 2,3-Dichloropropionyl chloride | 1-Amino-4-($\beta$-sulfatoethylsulfonyl)-benzene-2-sulfonic acid | orange |
| 49 | 3-Amino-5-hydroxynaphthalene-7-sulfonic acid | 2,3-Dichloropropionyl chloride | 1-Amino-3-($\beta$-sulfatoethylsulfonyl)-benzene | orange |
| 50 | 1,3-Diaminobenzene-4-sulfonic acid | 2,3-Dichloropropionyl chloride | 1-Amino-5-(4-($\beta$-chloroethylsulfonyl)-butyrylamino)-benzene-2-sulfonic acid | reddish yellow |
| 51 | 1,3-Diaminobenzene-4-sulfonic acid | 4-($\beta$-Chloroethylsulfonyl)-butyryl chloride | 1-Amino-5-(2,3-dibromopropionylamino)-benzene-2-sulfonic acid | reddish yellow |
| 52 | 1,3-Diaminobenzene-4-sulfonic acid | 4-($\beta$-Chloroethylsulfonyl)-butyryl chloride | 1-Amino-4-($\beta$-sulfatoethylsulfonyl)-benzene | reddish yellow |

With some of the dyes mentioned, further application advantages are obtained when one or two of their reactive groups are converted into the vinylsulfonyl group or the $\alpha$-halogenoacryloyl group, for example by one of the following two methods:

(a) An approximately 10% aqueous solution of the dye is brought to pH 9 at 20° C. The pH of the reaction solution is maintained at 9 by continuously neutralising the acid being liberated by adding 2N sodium hydroxide solution. When one equivalent of the 2N sodium hydroxide solution has been added, the reaction solution is brought to pH 6.5–7.0, and the reactive dye formed is isolated in a conventional manner. In the course of the elimination reaction, one reactive group of the dye has turned into its vinylsulfonyl group, or the two reactive groups have been partially converted into their vinylsulfonyl or $\alpha$-halogenoacryloyl groups.

(b) An approximately 10% aqueous solution of the dye is brought to pH 10 at 20° C. The pH of the reaction solution is held at 10 by continuously neutralising the acid being liberated by adding 2N sodium hydroxide solution. After the elimination reaction has ended, the reactive dye formed is salted out at pH 7, filtered, washed and dried in vacuo. In the course of the elimination reaction, the two reactive groups of the dye have been converted into their vinylsulfonyl or $\alpha$-halogenoacryloyl groups.

Dyeing method I 2 parts of the dye obtained as per Example 1 are dissolved in 400 parts of water; to this are added 1,500 parts of a solution which contains, per liter, 53 g of sodium chloride. 100 parts of a cotton fabric are introduced into this dyebath at 40° C. 45 minutes later, 100 parts of a solution which contains, per liter, 16 g of sodium hydroxide and 20 g of calcined sodium carbonate are added. The temperature of the dyebath is held at 40° C. for a further 45 minutes. Thereafter the goods dyed are rinsed, soaped at the boil with a nonionic detergent for a quarter of an hour, rinsed once more, and dried.

Dyeing method II 2 parts of the reactive dye obtained as per Example 1 are dissolved in 400 parts of water; to this are added 1,500 parts of a solution which contains, per liter, 53 g of sodium chloride. 100 parts of a cotton fabric are introduced into this dyebath at 35° C. 20 minutes later, 100 parts of a solution which contains, per liter, 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, soaped at the boil with a nonionic detergent for a quarter of an hour, rinsed once more, and dried.

Dyeing method III 8 parts of the reactive dye obtained as per Example 1 are dissolved in 400 parts of water; to this are added 1,400 parts of a solution which contains, per liter, 100 g of sodium sulfate. 100 parts of a cotton fabric are introduced into this dyebath at 25° C. 10 minutes later, 200 parts of a solution which contains, per liter, 150 g of trisodium phosphate are added. The temperature of the dyebath is then raised to 60° C. in the course of 10 minutes. The temperature is held at 60° C. for a further 90 minutes. The fabric is then rinsed, soaped at the boil with a nonionic detergent for a quarter of an hour, rinsed once more, and dried.

Dyeing method IV 4 parts of the reactive dye obtained as per Example 1 are dissolved in 50 parts of water. To this are added 50 parts of a solution which contains, per liter, 5 g of sodium hydroxide and 20 g of calcined sodium carbonate. The solution obtained is used to pad-mangle a cotton fabric in such a way that its weight increases by 70%, and the fabric is then wound onto a beam. The cotton fabric is stored in this state at room temperature for 3 hours. The dyed fabric is then rinsed, soaped at the boil with a nonionic detergent for a quarter of an hour, rinsed once more, and dried.

Dyeing method V 6 parts of the reactive dye obtained as per Example 1 are dissolved in 50 parts of water. To this are added 50 parts of a solution which contains, per liter, 16 g of sodium hydroxide and 0.04 liter of a 38° Bé sodium silicate solution. The solution obtained is used to pad-mangle a cotton fabric in such a way that its weight increases by 70%, and the fabric is then wound onto a beam. The cotton fabric is stored in this state at room temperature for 10 hours. The dyed fabric is then rinsed, soaped at the boil with a nonionic detergent for a quarter of an hour, rinsed once more, and dried.

Dyeing method VI 2 parts of the reactive dye obtained as per Example 1 are dissolved in 100 parts of water in the presence of 0.5 part of sodium m-nitrobenzenesulfonate. The solution obtained is used to impregnate a cotton fabric in such a way that its weight increases by 75%, and the fabric is then dried. The fabric is then impregnated with a warm solution at 20° C. which contains, per liter, 4 grammes of sodium hydroxide and 300 grammes of sodium chloride, and is squeezed to a 75% weight increase, and the dyeing is steamed at 100° to 102° C. for 30 to 60 seconds, is soaped in a 0.3% boiling solution of a nonionic detergent for a quarter of an hour, is rinsed, and is dried.

Dyeing method VII 4 parts of the reactive dye obtained as per Example 1 are dissolved in 50 parts of water in the presence of 1 part of sodium m-nitrobenzenesulfonate. To this are added 50 parts of a solution which contains, per liter, 120 g of sodium chloride, 40 g of calcined sodium carbonate and 100 g of urea. The solution obtained is used to pad-mangle a cotton fabric in such a way that its weight increases by 70%. The moist cotton fabric thus obtained is steamed at 102° C. in saturated steam for 90 seconds. The dyed fabric is then rinsed, soaped at the boil with a nonionic detergent for a quarter of an hour, rinsed once more, and dried.

Dyeing method VIII 6 parts of the reactive dye obtained as per Example 1 are dissolved in 50 parts of water in the presence of 1 part of sodium m-nitrobenzenesulfonate. To this are added 50 parts of a solution which contains, per liter, 20 g of calcined sodium carbonate and 400 g of urea. The solution obtained is used to pad-mangle a cotton fabric in such a way that its weight increases by 70%, and the fabric is then dried. The cotton fabric thus obtained is heat-set at 140° C. for 90 seconds. The dyed fabric is then rinsed, soaped at the boil with a nonionic detergent for a quarter of an hour, rinsed once more, and dried.

Dyeing method IX 4 parts of the reactive dye obtained as per Example 1 are dissolved in 50 parts of water in the presence of 1 part of sodium m-nitrobenzenesulfonate. To this are added 50 parts of a solution which contains, per liter, 11.2 g of sodium hydroxide, 0.04 liter of a 38° Bé sodium silicate solution, and 100 g of urea. The solution obtained is used to impregnate a cotton fabric in such a way that its weight increases by 70%, and the fabric is then dried. The cotton fabric thus obtained is steamed at 102° C. in saturated steam for 30 to 60 seconds. The dyed fabric is then rinsed, soaped at the boil with a nonionic detergent for a quarter of an hour, rinsed once more, and dried.

Printing method I 3 parts of the reactive dye obtained as per Example 1 are sprinkled into 100 parts of a stock thickening stirring at high speed and containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is dried, and the printed fabric obtained is steamed at 102° C. in saturated steam for 2 minutes. The printed fabric is then rinsed, if desired soaped at the boil and rinsed once more, and then dried.

Printing method II 5 parts of the reactive dye obtained as per Example 1 are sprinkled into 100 parts of a stock thickening which is stirring at high speed and contains 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained, the stability of which meets the technical requirements, is used to print a cotton fabric, which is then dried, and the printed fabric obtained is steamed at 102° C. in saturated steam for 8 minutes. The printed fabric is then rinsed, if desired soaped at the boil and rinsed once more, and then dried.

What is claimed is:

1. A reactive dye of the formula

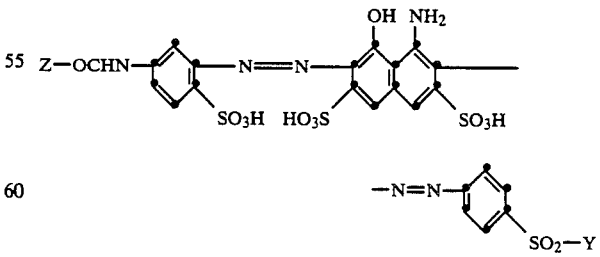

wherein Z is α,β-dibromoethyl, α-bromovinyl, 3-(β-chloroethylsulfonyl)-propyl or 3-vinylsulfonylpropyl, and Y is β-sulfatoethyl, vinyl, β-acetoxyethyl, β-phosophonooxyethyl, β-thiosulfatoethyl or β-chloroethyl.

2. A reactive dye of the formula

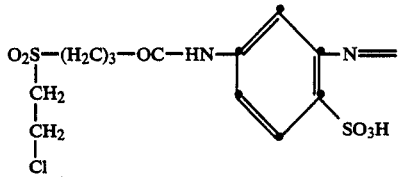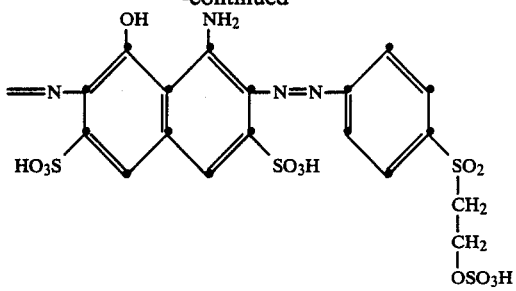
* * * * *